US011782638B2

United States Patent
Cho

(10) Patent No.: US 11,782,638 B2
(45) Date of Patent: Oct. 10, 2023

(54) STORAGE DEVICE WITH IMPROVED READ LATENCY AND OPERATING METHOD THEREOF

(71) Applicant: SK hynix Inc., Gyeonggi-do (KR)

(72) Inventor: Young Ick Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 58 days.

(21) Appl. No.: 17/160,059

(22) Filed: Jan. 27, 2021

(65) Prior Publication Data
US 2021/0397378 A1 Dec. 23, 2021

(30) Foreign Application Priority Data
Jun. 17, 2020 (KR) .................. 10-2020-0073795

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0611; G06F 3/0656; G06F 3/0658; G06F 12/0246; G06F 2212/1024; G06F 3/061; G06F 3/067; G06F 3/0619; G06F 3/064; G06F 3/0673; G06F 3/0688; G06F 2212/7201
See application file for complete search history.

(56) References Cited

U.S. PATENT DOCUMENTS

| | | | | |
|---|---|---|---|---|
| 9,213,632 | B1 * | 12/2015 | Song | G06F 3/0685 |
| 9,323,657 | B1 * | 4/2016 | Sela | G06F 11/0793 |
| 2015/0067237 | A1 * | 3/2015 | Yoshii | G06F 12/0873 |
| | | | | 711/103 |
| 2015/0317083 | A1 * | 11/2015 | Phan | G06F 3/0679 |
| | | | | 711/103 |
| 2017/0192902 | A1 * | 7/2017 | Hwang | G06F 12/0246 |
| 2018/0137048 | A1 * | 5/2018 | Hsu | G06F 12/0638 |
| 2018/0335975 | A1 * | 11/2018 | Cosby | G06F 3/0688 |
| 2019/0235762 | A1 * | 8/2019 | Kaburaki | G06F 3/0679 |
| 2019/0251039 | A1 * | 8/2019 | Modi | G06F 3/061 |
| 2021/0157518 | A1 * | 5/2021 | Bavishi | G06F 3/0679 |
| 2021/0334205 | A1 * | 10/2021 | Balluchi | G06F 12/0246 |
| 2022/0004489 | A1 * | 1/2022 | Cariello | G06F 3/0679 |

FOREIGN PATENT DOCUMENTS

| | | |
|---|---|---|
| KR | 10-2016-0131379 | 11/2016 |
| KR | 10-2017-0081126 | 7/2017 |

* cited by examiner

*Primary Examiner* — Rocio Del Mar Perez-Velez
*Assistant Examiner* — Tong B. Vo
(74) *Attorney, Agent, or Firm* — IP & T GROUP LLP

(57) ABSTRACT

A storage device includes: a nonvolatile memory configured to store map data; and a controller configured to divide map data to be uploaded among the map data into a plurality of map units and to process a normal read command queued in a command queue, after encoding a first map unit of the plurality of map units and before encoding a next map unit, among the plurality of map units, to be encoded after encoding of the first map unit is completed.

18 Claims, 13 Drawing Sheets

FIG. 3

| Map Segment | Logical Address | Physical Address |
|---|---|---|
| 0 | LBA0 | PBA0 ← L2P ENTRY |
|  | ⋮ | ⋮ |
|  | LBAi-1 | PBAi-1 |
| ⋮ | ⋮ | ⋮ |
| k-1 | ⋮ | ⋮ |

STORAGE DEVICE WITH IMPROVED READ LATENCY AND OPERATING METHOD THEREOF

CROSS-REFERENCE TO RELATED APPLICATION

The present application claims priority under 35 U.S.C. § 119(a) to Korean application number 10-2020-0073795, filed on Jun. 17, 2020, in the Korean Intellectual Property Office, which is incorporated herein by reference in its entirety.

BACKGROUND

1. Technical Field

Various embodiments generally relate to an electronic device, and more particularly, to a storage device and an operating method thereof.

2. Related Art

Recently, a paradigm for a computer environment has transitioned to ubiquitous computing which enables a computer system to be used anytime and anywhere. Therefore, the use of portable electronic devices such as cellular phones, digital cameras, and notebook computers is rapidly increasing. Such portable electronic devices generally use a data storage device including a memory component. The data storage device is used to store data used in the portable electronic devices.

Such data storage device is advantageous in that stability and durability are superior due to the absence of a mechanical driving unit, information access speed is very fast, and power consumption is low. Examples of data storage devices having such advantages include a universal serial bus (USB) memory apparatus, a memory card having various interfaces, a universal flash storage (UFS) device, and a solid state drive.

SUMMARY

Various embodiments are directed to providing a storage device capable of reducing a processing delay of a read command and an operating method thereof.

Various embodiments are directed to providing a storage device capable of accurately determining whether map information received from a host is valid and an operating method thereof.

In an embodiment, a storage device includes: a nonvolatile memory configured to store map data; and a controller configured to divide map data to be uploaded among the map data into a plurality of map units and to process a normal read command queued in a command queue, after encoding a first map unit of the plurality of map units and before encoding a next map unit, among the plurality of map units, to be encoded after encoding of the first map unit is completed.

In an embodiment, an operating method of a storage device including a nonvolatile memory storing map data and a controller includes: dividing map data to be uploaded among the map data into a plurality of map units; sequentially reading the plurality of map units and encoding the map units; and processing a normal read command queued in a command queue, after encoding a first map unit of the plurality of map units and before encoding a next map unit, among the plurality of map units, to be encoded after encoding of the first map unit is completed.

In an embodiment, a controller includes: a first core configured to serve as an interface with a host; and a second core configured to divide map data to be uploaded among map data stored in a nonvolatile memory into a plurality of map units and to process a normal read command queued in a command queue, after encoding a first map unit of the plurality of map units and before encoding a next map unit, among the plurality of map units, to be encoded after encoding of the first map unit is completed.

In an embodiment, an operating method of a controller includes: encoding each of a set number of map units; marking a map unit, among the set number of map units, that is updated after it is encoded; providing, after all of the set number of map units are encoded, a host with the encoded map units; and disregarding the marked map unit that is provided back from the host, wherein the encoding includes: interrupting the encoding while controlling a nonvolatile memory device to perform an operation; and resuming the encoding upon completion of the operation.

In accordance with an embodiment, the normal read command is processed in the middle of uploading, to the host, map data to be uploaded corresponding to one map read command received from the host, so that it is possible to reduce a processing delay of the normal read command and improve read performance.

Furthermore, in accordance with an embodiment, whether a map unit to be transmitted to the host has been encoded and whether mapping information of the map unit has been changed are managed with a bitmap, so that it is possible to accurately determine whether a map unit received from the host is valid.

BRIEF DESCRIPTION OF THE DRAWINGS

FIG. 3 is a diagram illustrating an address mapping table.

DETAILED DESCRIPTION

Hereinafter, various embodiments are described with reference to the accompanying drawings. Throughout the specification, reference to "an embodiment," "another embodiment" or the like is not necessarily to only one embodiment, and different references to any such phrase are not necessarily to the same embodiments.

Figure 1:
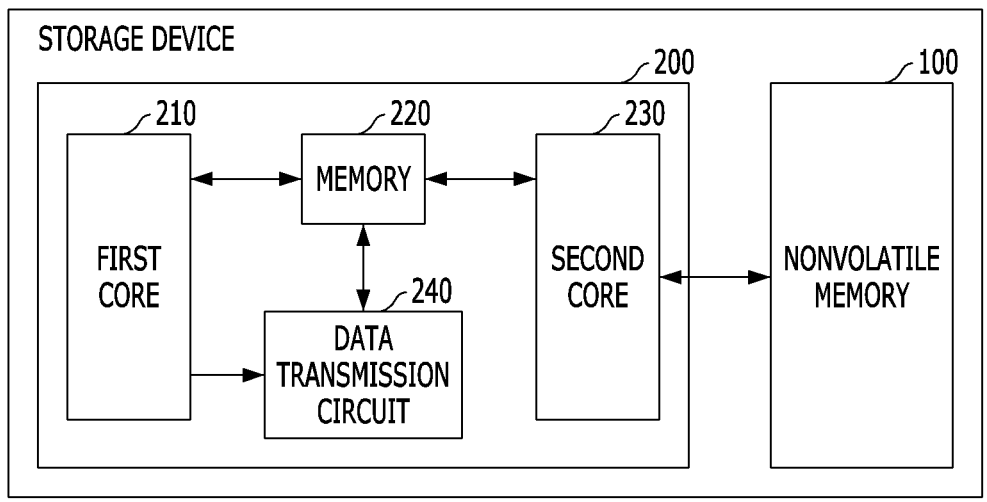
FIG. 1 is a diagram illustrating a storage device in accordance with an embodiment.

FIG. 1 is a diagram illustrating a configuration of a storage device 10 in accordance with an embodiment.

Referring to FIG. 1, the storage device 10 may store data that is accessed by a host (not illustrated) such as a cellular phone, an MP3 player, a laptop computer, a desktop computer, a game machine, a television, and an in-vehicle infotainment system. The storage device 10 may also be called a memory system.

The storage device 10 may be implemented with any of various types of storage devices according to an interface protocol connected to the host. For example, the storage device 10 may be configured as a multimedia card in the form of a solid state drive (SSD), an MMC, an eMMC, an RS-MMC, or a micro-MMC, a secure digital card in the form of an SD, a mini-SD, or a micro-SD, a universal serial bus (USB) storage device, a universal flash storage (UFS) device, a storage device in the form of a personal computer memory card international association (PCMCIA) card, a storage device in the form of a peripheral component interconnection (PCI) card, a storage device in the form of a PCI express (PCI-E) card, a compact flash (CF) card, a smart media card, and/or a memory stick.

The storage device 10 may be fabricated as any of various types of packages. For example, the storage device 10 may be fabricated as a package on package (POP), a system in package (SIP), a system on chip (SOC), a multi-chip package (MCP), a chip on board (COB), a wafer-level fabricated package (WFP), and/or a wafer-level stack package (WSP).

The storage device 10 may include a nonvolatile memory 100 and a controller 200.

The nonvolatile memory 100 may operate as a data storage medium of the storage device 10. The nonvolatile memory 100 may be configured as any of various types of nonvolatile memories, such as a NAND flash memory apparatus, a NOR flash memory apparatus, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using a transition metal oxide, according to the type of memory cells in the nonvolatile memory 100.

For clarity, FIG. 1 illustrates the nonvolatile memory 100 as one block; however, the nonvolatile memory 100 may include a plurality of memory chips (or dies). The present invention may be equally applied to the storage device 10 including the nonvolatile memory 100 composed of the plurality of memory chips.

The nonvolatile memory 100 may include a memory cell array (not illustrated) having a plurality of memory cells arranged at respective intersection regions of a plurality of bit lines (not illustrated) and a plurality of word lines (not illustrated). The memory cell array may include a plurality of memory blocks and each of the plurality of memory blocks may include a plurality of pages.

For example, each memory cell of the memory cell array may be a single level cell (SLC) that stores one bit, a multi-level cell (MLC) capable of storing two bits of data, a triple level cell (TLC) capable of storing three bits of data, or a quad level cell (QLC) capable of storing four bits of data. The memory cell array may include at least one of the single level cell, the multi-level cell, the triple level cell, and the quad level cell. Also, the memory cell array may include memory cells having a two-dimensional horizontal structure or memory cells having a three-dimensional vertical structure.

Figure 2:
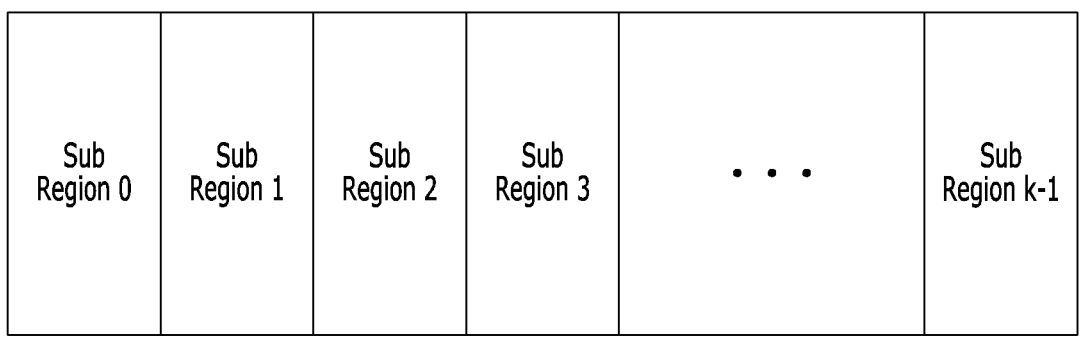
FIG. 2 is a diagram illustrating a nonvolatile memory, such as that of FIG. 1.

FIG. 2 is a diagram illustrating the nonvolatile memory 100 of FIG. 1.

Referring to FIG. 2, the nonvolatile memory 100 may include a plurality of subregions, i.e., Sub Region 0 to Sub Region k−1, where k is a natural number greater than or equal to 2. Each of the plurality of subregions may be of the same size. In another embodiment, at least two of the subregions may have different sizes. Each of the plurality of subregions may include a plurality of memory blocks, each of which may include a plurality of pages; however, the present invention is not limited to that particular arrangement. Each subregion may be a sub-memory region.

FIG. 3 is a diagram illustrating an address mapping table. Although not illustrated in FIG. 1, the nonvolatile memory 100 may include the address mapping table illustrated in FIG. 3.

Referring to FIG. 3, the address mapping table may include a plurality of map segments. Each of the plurality of map segments may include i logical addresses and i physical addresses mapped to the i logical addresses, respectively, where i is a natural number greater than or equal to 2. That is, each of the plurality of map segments may include i logical address to physical address (L2P) entries. Each L2P entry may include one logical address and one physical address mapped to the logical address.

The logical addresses included in each of the plurality of map segments may be sorted and arranged in an ascending or descending order; however, the present invention is not limited thereto to that particular arrangement. A physical address mapped to a corresponding logical address may be updated to a new (different) physical address indicating where data related to the corresponding logical address is newly stored. Furthermore, one or more mapped logical and physical address pairs may be unmapped according to an unmap request from the host.

As illustrated in FIG. 3, a plurality of map segments, i.e., 0 to k−1, where k is a natural number greater than or equal to 2, may correspond to the plurality of subregions, i.e., Sub Region 0 to Sub Region k−1, illustrated in FIG. 2, respectively. For example, the map segment '0' may correspond to Sub Region 0. Accordingly, the number of map segments and the number of subregions may be the same.

Furthermore, the map update operation may be performed on a map segment basis. The map update operation may include a map information change operation. The map information change may include changing a physical address mapped to a logical address to another physical address indicating another location where data related to the logical address is newly stored.

For example, when map information associated with logical address 'LBA0' is to be updated (or to be changed), all logical addresses LBA0 to LBAi−1 included in the map segment '0' are read during the map update operation and are stored in a map update buffer (not illustrated) of a memory 220, and then map information of 'LBA0', that is, physical address PBA may be changed.

Referring back to FIG. 1, the controller 200 may control overall operation of the storage device 10. The controller 200 may process requests received from the host. The controller 200 may generate control signals for controlling the operation of the nonvolatile memory 100 in response to the requests received from the host, and provide the generated control signals to the nonvolatile memory 100. The controller 200 may include a first core 210, the memory 220, a second core 230, and a data transmission circuit 240.

The first core 210 may serve as an interface between the host and the storage device 10 according to the protocol of the host. Therefore, the first core 210 may be called a protocol core. For example, the first core 210 may communicate with the host through any of universal serial bus (USB), universal flash storage (UFS), multi-media card (MMC), parallel advanced technology attachment (PATA), serial advanced technology attachment (SATA), small computer system interface (SCSI), serial attached SCSI (SAS), peripheral component interconnection (PCI), and PCI express (PCI-e) protocols.

The first core 210 may include a micro control unit (MCU) and a central processing unit (CPU).

The first core 210 may receive commands transmitted from the host and provide the received commands to the second core 230. For example, the first core 210 may queue the commands received from the host in a command queue (not illustrated) of the memory 220 and provide the second core 230 with information indicating that the commands are queued; however, the present invention is not limited to that particular arrangement.

The first core 210 may store data (for example, write data) received from the host in a write buffer (not illustrated) of the memory 220. Furthermore, the first core 210 may transmit data (for example, read data) stored in a read buffer (not illustrated) of the memory 220 to the host.

The memory 220 may be configured as a random access memory such as a static random access memory (SRAM) or a dynamic random access memory (DRAM); however, the present invention is not particularly limited thereto. Although FIG. 1 illustrates that the memory 220 is included in the controller 200, the memory 220 may be disposed outside the controller 200.

The memory 220 may be electrically connected to the first core 210 and the second core 230, and also may be physically so connected. The memory 220 may store firmware that is executed by the second core 230. Furthermore, the memory 220 may store data for executing the firmware, for example, meta data. That is, the memory 220 may operate as a working memory of the second core 230.

Furthermore, the memory 220 may be configured to include a write buffer for temporarily storing write data to be transmitted from the host to the nonvolatile memory 100 and a read buffer for storing read data to be transmitted from the nonvolatile memory 100 to the host. That is, the memory 220 may operate as a buffer memory. The internal configuration of the memory 220 is described below in detail with reference to FIG. 4.

The second core 230 may control overall operation of the storage device 10 by executing firmware or software loaded in the memory 220. The second core 230 may decrypt and execute a code type instruction or algorithm such as firmware or software. Therefore, the second core 230 may also be called a flash translation layer (FTL) core. The second core 230 may include a micro control unit (MCU) and a central processing unit (CPU).

The second core 230 may generate control signals for controlling the operation of the nonvolatile memory 100 on the basis of a command provided from the first core 210, and provide the generated control signals to the nonvolatile memory 100. The control signals may include a command, an address, an operation control signal and the like for controlling the nonvolatile memory 100. The second core 230 may provide the nonvolatile memory 100 with the write data temporarily stored in the memory 220, or store the read data received from the nonvolatile memory 100 in the memory 220.

The second core 230 may divide map data to be uploaded, which is stored in the nonvolatile memory 100, into a plurality of map units, read and encode the map units from the nonvolatile memory 100 on a map unit basis, and transmit the encoded map units to the host. The second core 230 may dequeue and process a normal read command queued in a command queue 227 of the memory 220 after encoding one map unit and before reading a next map unit from the nonvolatile memory 100.

Figure 4:
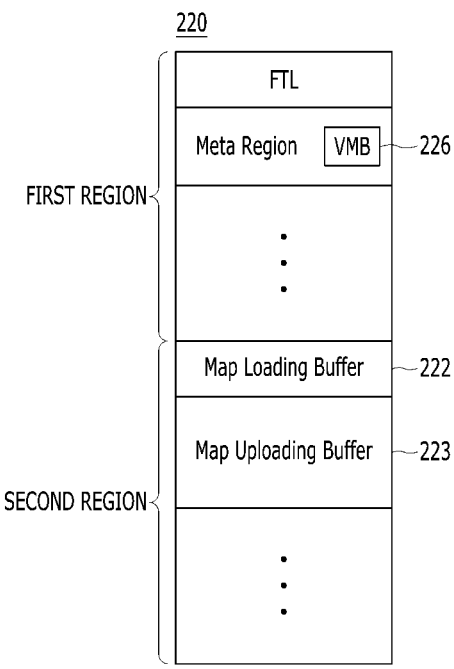
FIG. 4 is a diagram illustrating a memory, such as that of FIG. 1.

Furthermore, after the encoding of the map unit read from the nonvolatile memory 100 is completed, the second core 230 may set a bit corresponding to the encoded map unit in a valid map data bitmap 226 (see FIG. 4). This set bit may indicate that the encoded map unit to be uploaded to the host is valid map information.

Furthermore, when there is an encoded map unit in which map information has changed due to the map update operation after the encoding of the map unit, the second core 230 may clear a previously set bit, corresponding to the encoded map unit, in the valid map data bitmap 226 to indicate such change. This clearing of the previously set bit may indicate that the encoded map unit to be uploaded to the host is invalid map information.

The data transmission circuit 240 may operate according to the control signal provided from the first core 210. For example, the data transmission circuit 240 may store the write data, which is received from the host, in the write buffer of the memory 220 according to the control signal(s) received from the first core 210. Furthermore, the data transmission circuit 240 may read the read data stored in the read buffer of the memory 220 and transmit the read data to the host according to the control signal(s) received from the first core 210. Furthermore, the data transmission circuit 240 may transmit map data (for example, the encoded map unit) stored in the memory 220 to the host according to the control signal received from the first core 210.

FIG. 4 is a diagram illustrating the memory 220 of FIG. 1.

Referring to FIG. 4, the memory 220 in accordance with an embodiment may be divided into a first region and a second region; however, the present disclosure is not limited to this particular arrangement. For example, the first region of the memory 220 may store software (or firmware) interpreted and executed by the second core 230 and meta data and the like used when the second core 230 performs computation and processing operations. Furthermore, the first region of the memory 220 may store commands received from the host.

For example, software stored in the first region of the memory 220 may be the flash translation layer (FTL). The flash translation layer (FTL) may be executed by the second core 230, and the second core 230 may execute the flash translation layer (FTL) to control operation of the nonvolatile memory 100, and provide the host with device compatibility. Through the execution of the flash translation layer (FTL), the host may recognize and use the storage device 10 as a general storage device such as a hard disk.

The flash translation layer (FTL) may be stored in a system region (not illustrated) of the nonvolatile memory 100, and when the storage device 10 is powered on, the flash translation layer (FTL) may be read from the system region of the nonvolatile memory 100 and loaded in the first region of the memory 220. Furthermore, the flash translation layer (FTL) loaded in the first region of the memory 220 may also be loaded in a dedicated memory (not illustrated) disposed in or external to the second core 230.

The flash translation layer (FTL) may include modules for performing various functions. For example, the flash translation layer (FTL) may include a read module, a write module, a garbage collection module, a wear-leveling module, a bad block management module, a map module, and the like; however, the present invention is not limited to those particular modules. For example, each of the modules included in the flash translation layer (FTL) may be composed of a set of source codes for performing a specific operation (or function).

The map module may control the nonvolatile memory 100 and the memory 220 to perform operations related to the map data. The operations related to the map data may generally include a map update operation, a map caching operation, and a map upload operation; however, the present invention is not limited to those particular operations.

The map update operation may include changing the physical address of an L2P entry stored in the address mapping table (see FIG. 3) to another physical address indicating another location where data related to the logical address of that L2P entry is newly stored and storing the updated L2P entry with the changed physical address in the nonvolatile memory 100. The map update operation may be an operation of changing map information.

The map caching operation may include reading, from the nonvolatile memory 100, a map segment that includes an L2P entry corresponding to a logical address received with a read command from the host, and storing the map segment in a map caching buffer (not illustrated) of the memory 220. The map caching operation may be performed on a logical address frequently requested to be read and/or a logical address most recently requested to be read.

The map upload operation may include reading map data to be uploaded from the nonvolatile memory 100 and transmitting the map data to the host. The operation of reading the map data to be uploaded from the nonvolatile memory 100 and transmitting the map data to be uploaded to the host may be performed on a map unit basis. The map upload operation may further include an operation of encoding the map data to be uploaded. The operation of encoding the map data to be uploaded may be performed on a map unit basis.

For example, the second core 230 may divide the map data to be uploaded in the nonvolatile memory 100 into a plurality of map units in response to a map read command received from the host, sequentially read the map units starting from the first map unit, encode the read map units, and then transmit the encoded map units to the host. For example, the operation of encoding the map units may include adding meta information (information related to a corresponding map unit) and a cyclical redundancy check (CRC) value to the map units and randomizing the map units; however, the encoding method of the map units is not limited to these particular operations.

The first region of the memory 220 may include a meta region where meta data used for driving various modules included in the flash translation layer (FTL) is stored. The meta region may store the valid map data bitmap (VMB) 226 composed of one or more bits for map data corresponding to each of the subregions, i.e., Sub Region 0 to Sub Region k−1. The map loading buffer 222 and the map uploading buffer 223 within the second region of the memory 220 are described in more detail with reference to FIG. 6.

Figure 5:
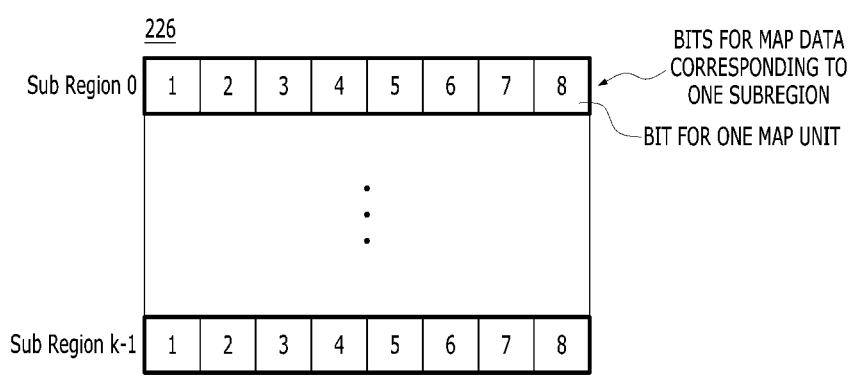
FIG. 5 is a diagram illustrating a valid map data bitmap, such as that of FIG. 4.

FIG. 5 is a diagram illustrating the valid map data bitmap (VMB) 226.

Referring to FIG. 5, the valid map data bitmap 226 may be composed of one or more bits for map data corresponding to each of the subregions, i.e., Sub Region 0 to Sub Region k−1. For example, when map data corresponding to one subregion is divided into 8 map units, 8 bits may be allocated to each of Sub Region 0 to Sub Region k−1, and each bit may indicate whether a corresponding map unit is valid. It may need to be determined whether the map unit uploaded to the host is valid when the uploaded map unit is provided back from the host to the storage device 10 when the host requests an operation of the storage device 10. The fact that the map unit uploaded to the host is valid may indicate that the map unit is the latest map information.

For example, when encoding of a map unit to be uploaded to the host is completed, the second core 230 may set a corresponding bit among the bits of the valid map data bitmap 226. This may indicate that the map unit encoded and to be uploaded to the host is the latest map information and is valid.

In an embodiment, operations may be performed in response to commands queued in a command queue even before operations are completed in response to one map read command. In an embodiment, operations may be performed in response to the commands, particularly, normal read commands queued in the command queue, while operations are being performed in response to a map read command. Therefore, there is a chance that map information within encoded map data to be uploaded changes due to the operations being performed in response to the queued commands while operations are being performed in response to the map read command, and thus the encoded map data to be uploaded to the host, and within which the map information is changed after the encoding, may not be the latest map unit anymore.

Accordingly, when encoding of a map unit to be uploaded to the host is completed, the second core 230 sets a bit corresponding to the encoded map unit among the bits of the valid map data bitmap 226. When there is an encoded map unit, within which map information changed due to the map update operation, the second core 230 clears a corresponding set bit of the valid map data bitmap 226. By so doing, it is possible to accurately determine whether map information received thereafter from the host is valid according to whether a corresponding bit of the received map data including the received map information is set or cleared within the valid map data bitmap 226.

Figure 6:
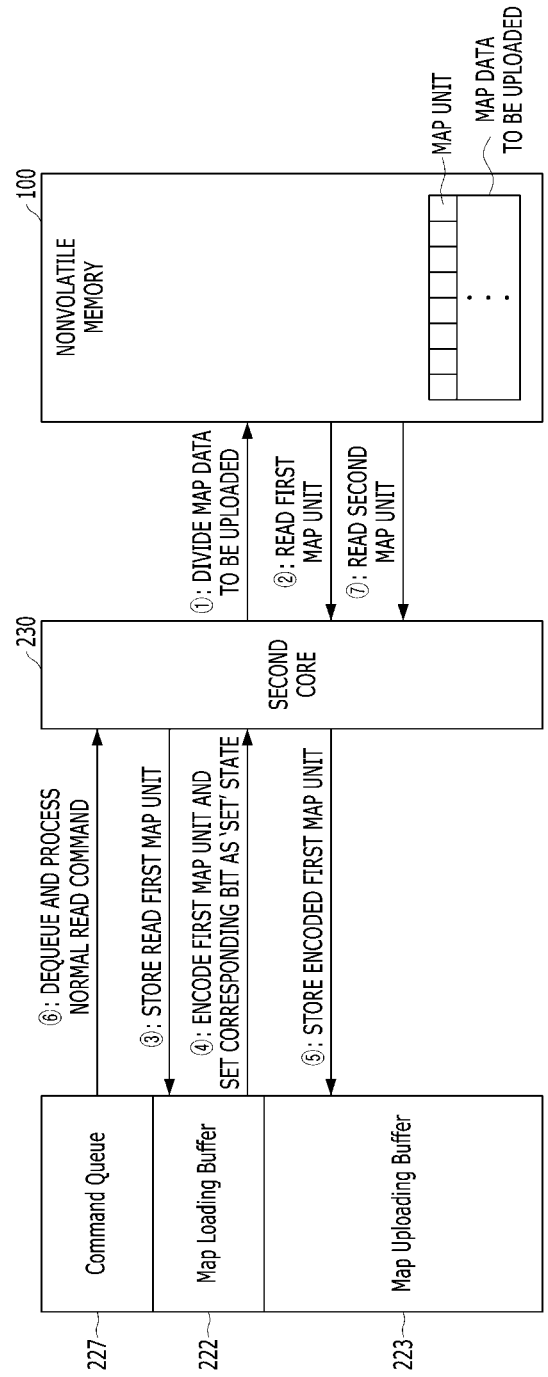
FIG. 6 is a diagram illustrating an operation of processing a normal read command while processing a map read command in accordance with an embodiment.

FIG. 6 is a diagram illustrating an operation of processing a normal read command while processing one map read command in accordance with an embodiment. Although not illustrated in FIG. 6, it is assumed that the map read command has been received from the host. The received map read command may include information on a subregion corresponding to map data to be uploaded, and the second core 230 may determine map data to be uploaded on the basis of the information included in the map read command.

Referring to FIG. 6, the second core 230 may divide map data to be uploaded, which is stored in the nonvolatile memory 100, into a plurality of map units (①). Then, the second core 230 may read the first map unit of the plurality of map units from the nonvolatile memory 100 (②) and store the read first map unit in a map loading buffer 222 (③).

Then, the second core 230 may read and encode the first map unit from the map loading buffer 222, and set a bit corresponding to the encoded first map unit of the valid map data bitmap 226 (④). Furthermore, the second core 230 may store the encoded first map unit in a map uploading buffer 223 (⑤).

Then, the second core 230 may dequeue and process a normal read command among commands queued in the command queue 227 of the memory 220 (⑥). When the processing of the normal read command is completed, the second core 230 may read a second map unit from the nonvolatile memory 100 (⑦). Then, although not illustrated in the FIG. 6, the second core 230 may store the read second map unit in the map loading buffer 222, encode the second map unit, set a bit corresponding to the encoded second map unit of the valid map data bitmap 226, and store the encoded second map unit in the map uploading buffer 223. Then, the second core 230 may dequeue and process the normal read command among the commands queued in the command queue 227.

As described above, the normal read command is processed while uploading, to the host, map data corresponding to one map read command received from the host, so that it is possible to reduce a processing delay of the normal read command and improve read performance.

Figure 7:
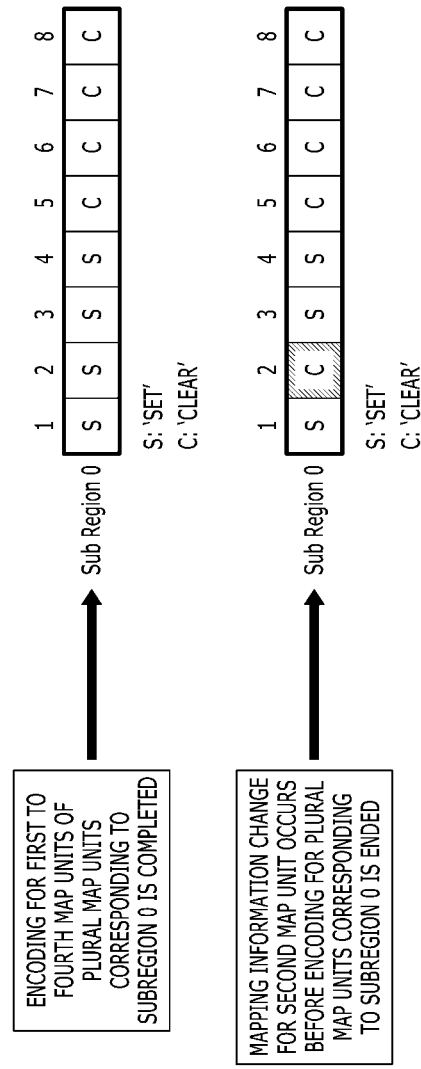
FIG. 7 is a diagram illustrating an operation of changing a valid map data bitmap for each of completion of encoding of map data and map information change in accordance with an embodiment.

FIG. 7 is a diagram illustrating an operation of changing the valid map data bitmap for each of completion of encoding of map data and map information change in accordance with an embodiment. For example, it is assumed that map information has changed before all eight map units corresponding to Sub Region 0 are completely encoded.

Referring to FIG. 7, it can be understood that the second core 230 has encoded first to fourth map units of the eight map units, and thus the encoded first to fourth map units to be uploaded to the host are now valid map units having the latest map information.

Then, when the map update operation is triggered and map information of the encoded second map unit is changed after completion of the encoding of the four map units and before the encoding of the remaining fifth to eighth map units, the second core 230 clears a set bit corresponding to the second map unit that is encoded and then updated. That is, it indicates that the encoded second map unit to be uploaded to the host has become an invalid map unit.

As described above, a bit corresponding to a completely encoded map unit is set and a set bit corresponding to the encoded map unit, in which map information is changed after the encoding, is cleared, so that it is possible to accurately determine whether a map unit received thereafter from the host is valid according to the state (set or cleared) of the corresponding bit of the received map unit within the valid map data bitmap 226.

Figure 8:
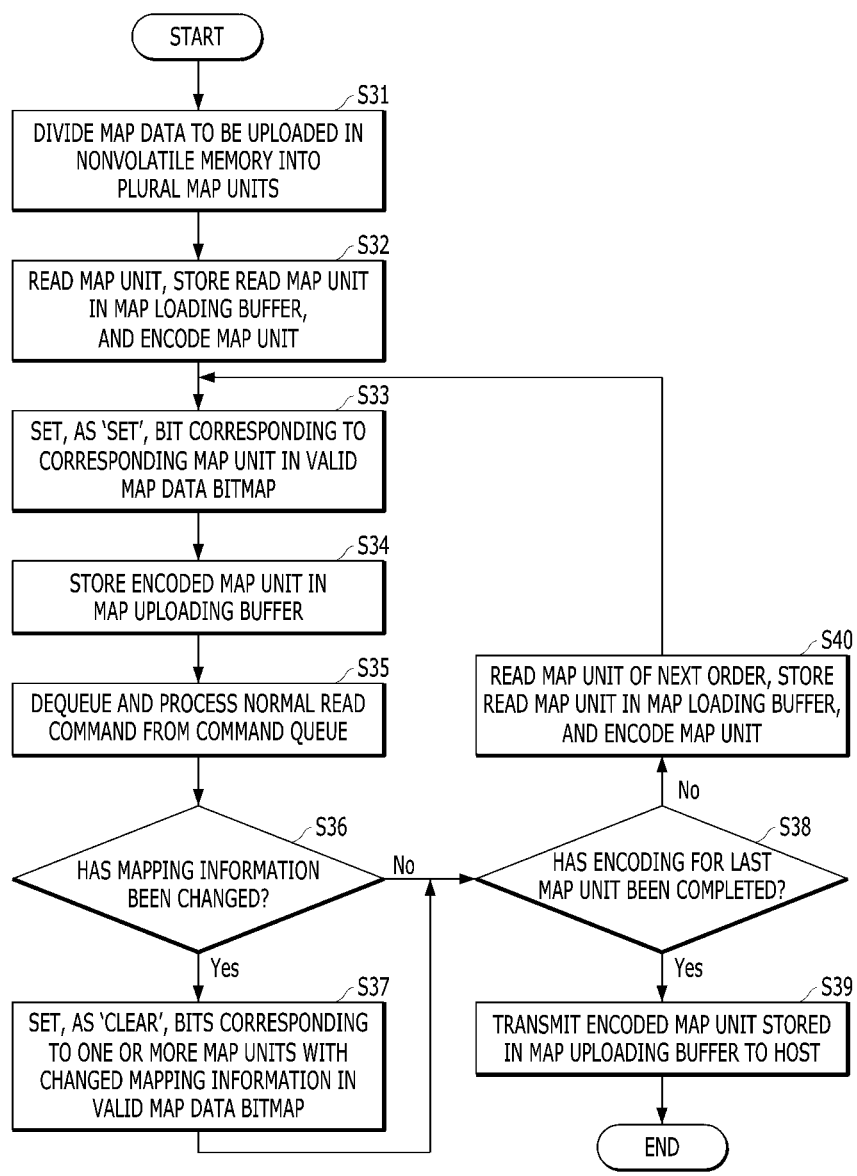
FIG. 8 is a flowchart illustrating an operating method of the storage device in accordance with an embodiment.

FIG. 8 is a flowchart illustrating an operating method of the storage device in accordance with an embodiment. Although not illustrated in FIG. 8, it is assumed that a map read command has been received from the host. In describing the operating method of the storage device in accordance with reference to FIG. 8, secondary reference may be made to other figures.

In operation S31, the second core 230 of the controller 200 may divide map data to be uploaded in the nonvolatile memory 100 into a plurality of map units.

In operation S32, the second core 230 may read a map unit from the nonvolatile memory 100, store the read map unit in the map loading buffer 222, and then encode the map unit. For example, the second core 230 may sequentially read the plurality of map units starting from a first map unit and encode the read map units.

In operation S33, the second core 230 may set a bit corresponding to a corresponding map unit, which is encoded and to be uploaded, in the valid map data bitmap.

In operation S34, the second core 230 may store the encoded map unit in the map uploading buffer 223.

In operation S35, the second core 230 may dequeue and process the normal read command from the command queue 227.

In operation S36, the second core 230 may determine whether map information within the encoded map unit has been changed. For example, when the map update operation has been performed for the encoded map unit, the second core 230 may determine that the map information has been changed within the encoded map unit. When the map information has been changed within the encoded map unit, the process may proceed to operation S37. When the map information has not been changed within the encoded map unit, the process may proceed to operation S38.

In operation S37, the second core 230 may clear set bits corresponding to one or more encoded map units, within which the map information has changed after the encoding, in the valid map data bitmap.

In operation S38, the second core 230 may determine whether encoding of the last map unit of the map data to be uploaded has been completed. When the encoding of the last map unit has been completed, the process may proceed to operation S39. When the encoding of the last map unit has not been completed, the process may proceed to operation S40.

In operation S39, the second core 230 may transmit the encoded map units stored in the map uploading buffer 223 to the host. For example, the second core 230 may provide the first core 210 with information indicating that encoding for all map data to be updated has been completed, and the first core 210 may provide a control signal to the data transmission circuit 240 on the basis of the received information. The data transmission circuit 240 may transmit the encoded map units, stored in the map uploading buffer 223, to the host according to the received control signal.

In operation S40, the second core 230 may read a next map unit from the nonvolatile memory 100, store the read map unit in the map loading buffer 222, encode the next map unit and then repeat operations S33 to S40.

Figure 9:
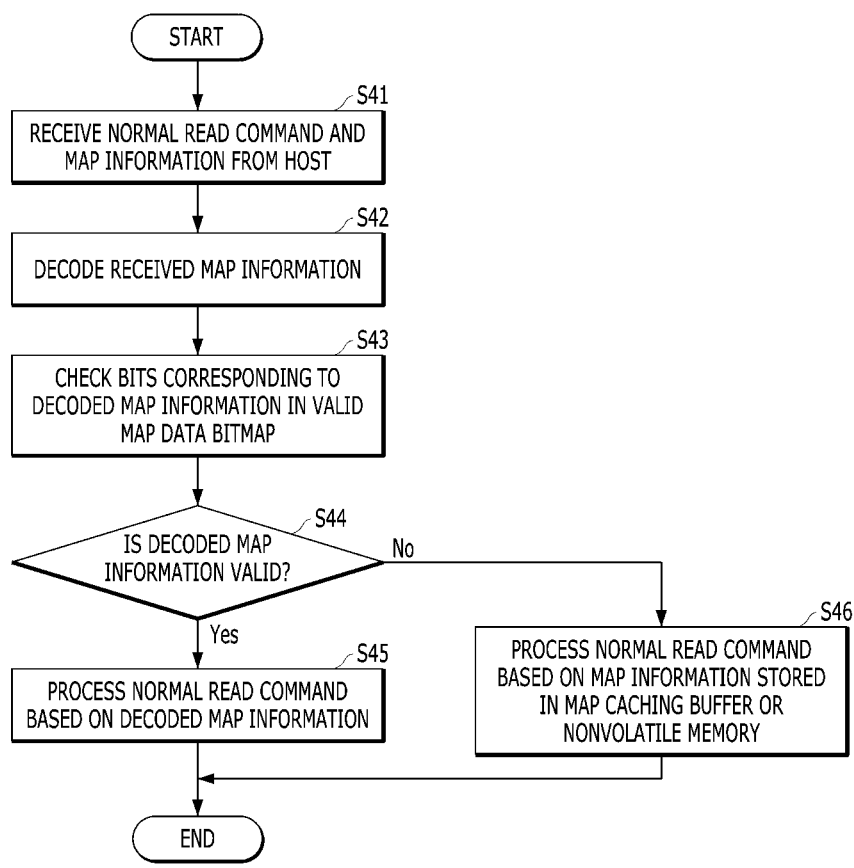
FIG. 9 is a flowchart illustrating a method of processing a normal read command on the basis of whether map information received from a host is valid, in accordance with an embodiment.

FIG. 9 is a flowchart illustrating a method of processing the normal read command on the basis of whether map information received from the host is valid in accordance with an embodiment.

In operation S41, the normal read command and map information may be received from the host. The map information may be map data (or map units) uploaded from the controller 200 of the storage device 10. The map information received from the host may include one or more map entries each including a logical address and a physical address mapped to the logical address.

In operation S42, the first core 210 may decode the map information received from the host. The host may transmit an uploaded map unit, which is encoded, to the storage device 10. Accordingly, the encoded map unit may be decoded by the controller 200 of the storage device 10. The first core 210 may provide the decoded map information and normal read command to the second core 230.

In operation S43, the second core 230 may check a bit corresponding to the decoded map information among the bits of the valid map data bitmap on the basis of the decoded map information provided from the first core 210.

In operation S44, the second core 230 may determine whether the decoded map information is valid. That is, the second core 230 may determine whether the decoded map information is the latest (most up-to-date) map information, and is thus valid. When the decoded map information is valid, the process may proceed to operation S45, and when the decoded map information is invalid, the process may proceed to operation S46.

In operation S45, the second core 230 may process the normal read command on the basis of the decoded map information.

In operation S46, the second core 230 may process the normal read command on the basis of map data stored in the map caching buffer of the memory 220 or map data stored in the nonvolatile memory 100.

Figure 10:
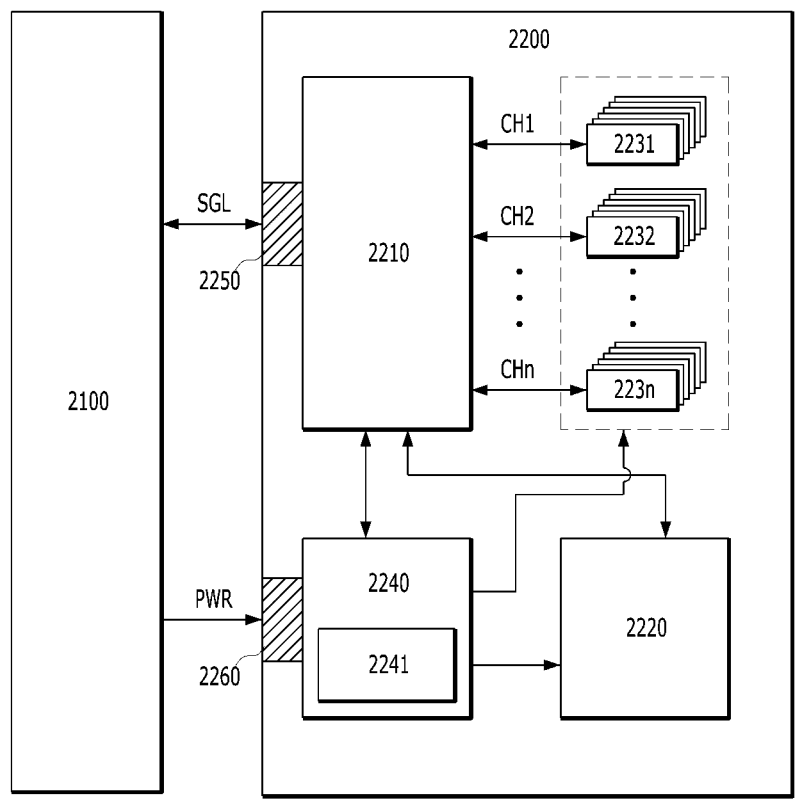
FIG. 10 is a diagram illustrating a data processing system including a solid state drive (SSD) in accordance with an embodiment.

FIG. 10 illustrates a data processing system including a solid state drive (SSD) in accordance with an embodiment. Referring to FIG. 10, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn, respectively. In another embodiment, one or more nonvolatile memory devices may be coupled to the same channel, in which case there may be a lesser number of channels than memory devices. The nonvolatile memory devices coupled to the same channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is properly terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

Figure 11:
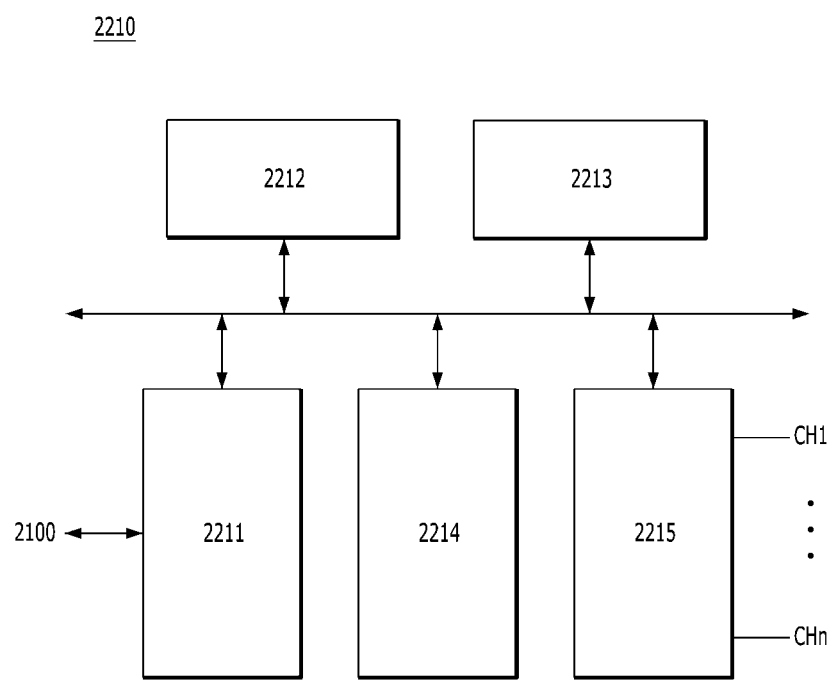
FIG. 11 is a diagram illustrating a controller illustrated in FIG. 10.

FIG. 11 illustrates the controller 2210 of FIG. 10. Referring to FIG. 11, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and/or a universal flash storage (UFS) protocol. The host interface 2211 may perform a disc emulation function such that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When the number of detected errors is within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 12:
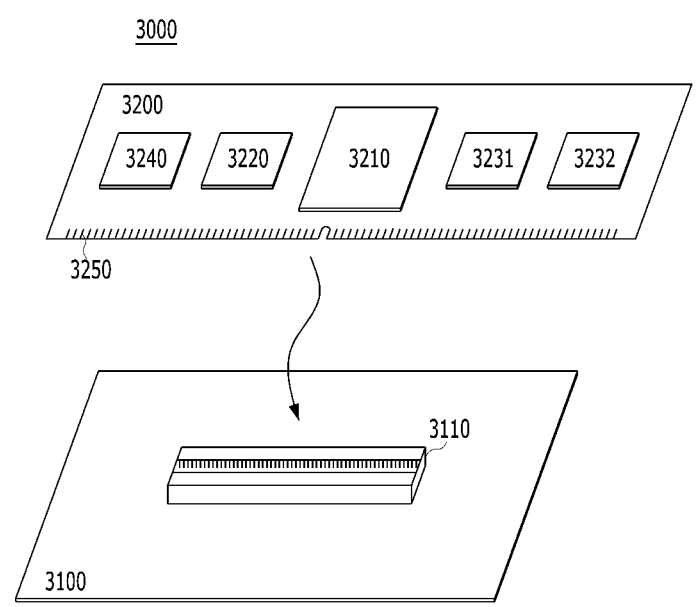
FIG. 12 is a diagram illustrating a data processing system including a data storage apparatus in accordance with an embodiment.

FIG. 12 illustrates a data processing system including a data storage apparatus in accordance with an embodiment. Referring to FIG. 12, a data processing system 3000 may include a host apparatus 3100 and a data storage apparatus 3200.

The host apparatus 3100 may be configured in a board form such as a printed circuit board (PCB). Although not shown in FIG. 12, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may have the same configuration as the controller 2210 illustrated in FIG. 11.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in any of various forms according to an interfacing method between the host apparatus 3100 and the data storage apparatus 3200. The connection terminal 3250 may be arranged in or on any side of the data storage apparatus 3200.

Figure 13:
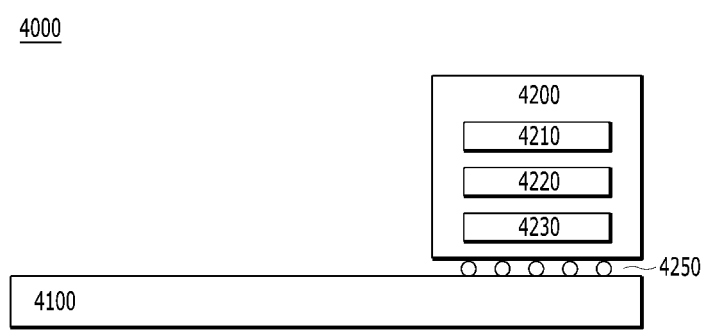
FIG. 13 is a diagram illustrating a data processing system including a data storage apparatus in accordance with an embodiment.

FIG. 13 illustrates a data processing system including a data storage apparatus in accordance with an embodiment. Referring to FIG. 13, a data processing system 4000 may include a host apparatus 4100 and a data storage apparatus 4200.

The host apparatus 4100 may be configured in a board form such as a PCB. Although not shown in FIG. 13, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 11.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 14:
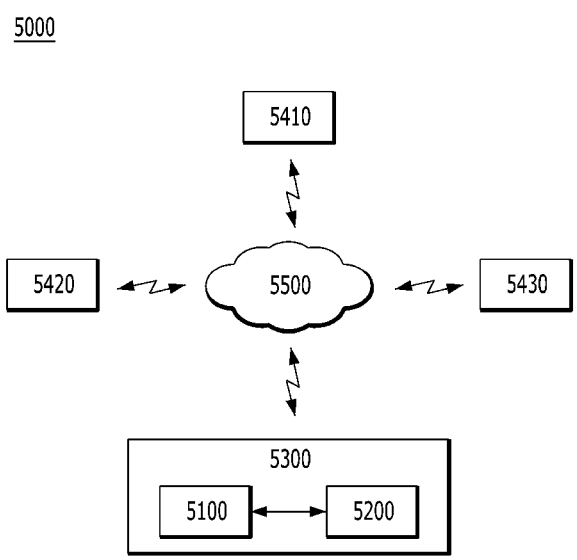
FIG. 14 is a diagram illustrating a network system including a data storage apparatus in accordance with an embodiment.

FIG. 14 illustrates a network system 5000 including a data storage apparatus in accordance with an embodiment. Referring to FIG. 14, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the storage device 10 of FIG. 1, the SSD 2200 of FIG. 10, the data storage apparatus 3200 of FIG. 12, or the data storage apparatus 4200 of FIG. 13.

Figure 15:
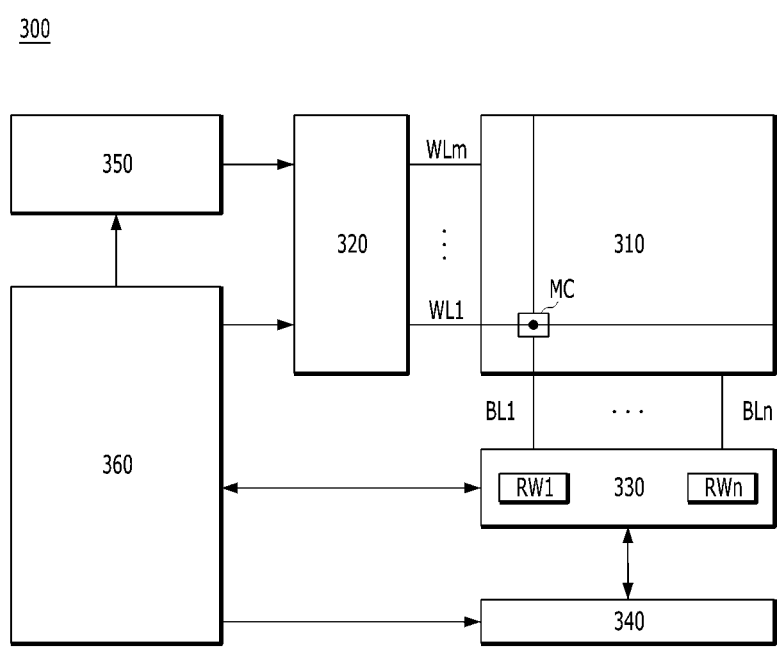
FIG. 15 is a diagram illustrating a nonvolatile memory device included in a data storage apparatus in accordance with an embodiment.

FIG. 15 illustrates a nonvolatile memory device included in a data storage apparatus in accordance with an embodiment. Referring to FIG. 15, a nonvolatile memory device 100 may include a memory cell array 110, a row decoder 120, a column decoder 140, a data read/write block 130, a voltage generator 150, and control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control overall operation of the nonvolatile memory device 100 based on a control signal provided from an external apparatus, i.e., a host. For example, the control logic 160 may control various operations of the nonvolatile memory device 100 such as a read operation, a write operation, an erase operation of the nonvolatile memory device 100.

While various embodiments have been illustrated and described, it will be understood by those skilled in the art that the disclosed embodiments are examples only. Accordingly, the present invention is not limited to or by any of the disclosed embodiments. Rather, the present invention encompasses all variations and modifications that fall within the scope of the claims.

What is claimed is:

1. A storage device comprising:
a nonvolatile memory configured to store at least map data; and
a controller configured to divide first map data, in response to a first map read command requesting the first map data be uploaded to a host, into a plurality of map units and to process a normal read command queued in a command queue, wherein the normal read command is configured to be processed after encoding a first map unit of the plurality of map units divided from the first map data according to the first map read command and before encoding a next map unit, among the plurality of map units divided from the first map data according to the first map read command, to be encoded after the encoding of the first map unit is completed,
wherein the normal read command is a command to read data received from the host and written to the nonvolatile memory.

2. The storage device according to claim 1, wherein, when all of the plurality of map units are completely encoded, the controller transmits the encoded map units to the host.

3. The storage device according to claim 1, further comprising: a memory including a valid map data bitmap composed of bits indicating validity or invalidity of the encoded map units, respectively.

4. The storage device according to claim 3, wherein, for each of the plurality of map units, the controller sets a corresponding bit among the bits of the valid map data bitmap to indicate that encoding of a corresponding map unit among the plurality of map units is completed.

5. The storage device according to claim 4, wherein, for each of the encoded map units, the controller is further configured to clear the set bit of the corresponding encoded map unit when map information therein changes after the corresponding map unit is encoded.

6. The storage device according to claim 1, further comprising: a memory including a first buffer and a second buffer.

7. The storage device according to claim 6, wherein the controller is further configured to read one of the plurality of map units from the nonvolatile memory, store the read map unit in the first buffer, encode the read map unit stored in the first buffer, and store the encoded map unit in the second buffer.

8. An operating method of a storage device including a nonvolatile memory storing at least map data and a controller, the operating method comprising:
dividing first map data, in response to a first map read command requesting the first map data be uploaded to a host, into a plurality of map units;
sequentially reading the plurality of map units divided from the first map data according to the first map read command and encoding the map units; and
processing a normal read command queued in a command queue, after encoding a first map unit of the plurality of map units divided from the first map data according to the first map read command and before encoding a next map unit, among the plurality of map units divided from the first map data according to the first map read command, to be encoded after the encoding of the first map unit is completed,
wherein the normal read command is a command to read data received from the host and written to the nonvolatile memory.

9. The operating method according to claim 8, wherein the encoding of the map units comprises:
reading a select one of the plurality of map units from the nonvolatile memory and storing the read map unit in a map loading buffer; and
reading the select map unit from the map loading buffer and encoding the select map unit.

10. The operating method according to claim 9, further comprising:
storing the encoded select map unit in a map uploading buffer; and
transmitting the encoded select map unit stored in the map uploading buffer to the host according to whether a last map unit of the plurality of map units has been encoded.

11. The operating method according to claim 8, wherein the encoding of the map units comprises: setting a bit corresponding to the encoded select map unit among bits of a valid map data bitmap to indicate that the select map unit has been encoded.

12. The operating method according to claim 11, further comprising:
determining whether map information of the encoded select map unit has changed after the encoding; and
clearing the set bit corresponding to the encoded select map unit to indicate that the map information thereof has changed.

13. A controller comprising:
a first core configured to serve as an interface with a host; and
a second core configured to divide first map data, in response to a first map read command requesting the first map be uploaded to the host among map data stored in a nonvolatile memory, into a plurality of map units and to process a normal read command queued in a command queue, after encoding a first map unit of the plurality of map units divided from the first map data according to the first map read command and before encoding a next map unit, among the plurality of map units divided from the first map data according to the first map read command, to be encoded after the encoding of the first map unit is completed,
wherein the normal read command is a command to read data received from the host and written to the nonvolatile memory.

14. The controller according to claim 13, wherein, when all of the plurality of map units are completely encoded, the second core transmits, to the first core, information indicating that the encoding of the first map data to be uploaded has been completed.

15. The controller according to claim 14, wherein the first core is further configured to transmit the encoded first map data to be uploaded to the host on the basis of the information received from the second core.

16. The controller according to claim 13, further comprising: a memory configured to store a valid map data bitmap composed of bits indicating validity or invalidity of the encoded map units, respectively.

17. The controller according to claim 16, wherein, for each of the encoded map units, the second core is further configured to set a bit corresponding to the encoded map unit among the bits within the valid map data bitmap to indicate that the corresponding encoded map unit has been encoded.

18. The controller according to claim 17, wherein, for each of the encoded map units, the second core is further configured to clear the corresponding set bit when map information changes after the encoding of the corresponding map unit.

\* \* \* \* \*